PULSE DELAY CONTROL CIRCUIT

Filed Dec. 17, 1965 Sheet 1 of 2

INVENTOR
W. M. REGITZ
BY William H. Kamstra
ATTORNEY

United States Patent Office 3,435,438

Patented Mar. 25, 1969

3,435,438

PULSE DELAY CONTROL CIRCUIT

William M. Regitz, Colonia, N.J., assignor to Bell Telephone Laboratories, Incorporated, New York, N.Y., a corporation of New York Filed Dec. 17, 1965, Ser. No. 514,585

Int. Cl. G11b *5/86*

U.S. Cl. 340—174 13 Claims

Figure 1:
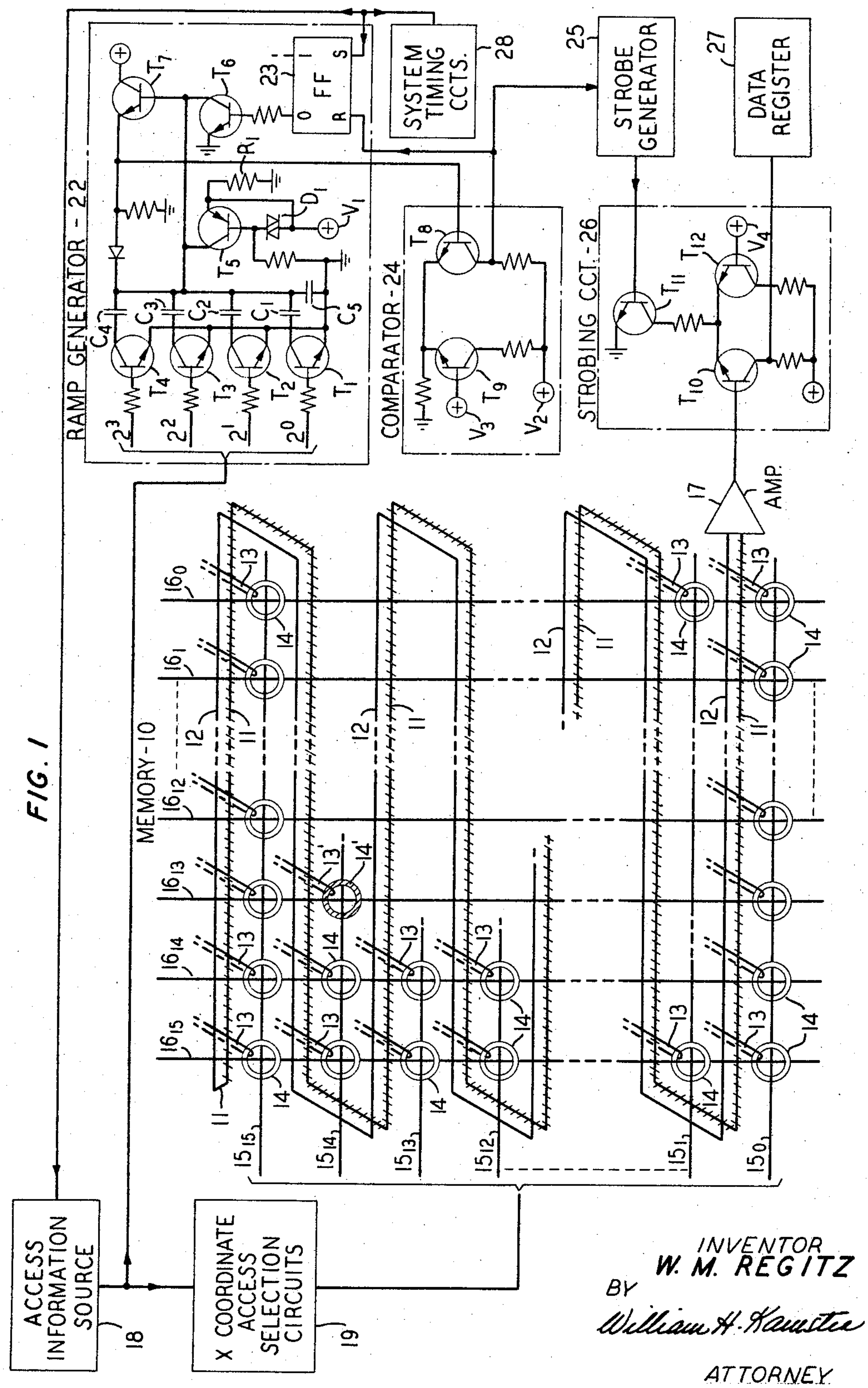

This inyention relates to information storage systems and particularly to electrical circuits adapted to detect the information stored in such systems.

In magnetic information storage systems noise signals occurring on the output sensing conductors present one of the chief problems encountered in the detection of the stored information. Noise signals may be continuously present and may seriously interfere in the discrimination between the output signal conditions indicating the stored information during a read cycle. The elimination or at least the reduction of the effects of noise is thus an important goal in the design of information storage systems.

One well known expedient for minimizing the effects of noise has been to restrict its transmission through the same amplifier to a brief interval during the actual production of a readout signal condition. By strobing the output signal, particularly if the strobing is adjusted to occur during the isgnal interval where the signal-to-noise ratio is the greatest, the effects of system noise are substantially reduced. Strobing effectively disables the sensing conductors of the storage system at all times other than the relatively short time during which the strobe signal is applied. A very narrow strobe pulse, however, in sharply reducing the overall noise effects, gives rise to its own problems. To achieve the maximum benefit from the strobe operation it should be adjusted to occur at the point in the output signal where its amplitude is the greatest, that is, where the signal-to-noise ratio is the greatest, as mentioned. The amplitude of the signal, however, is largely dependent upon signal peaking variations. These variations may be somewhat controlled by shaping the output signal by known amplifier techniques. Another and more serious problem can be the timing of the occurrence of the output signal itself.

In magnetic memories in which each sensing conductor serves many bit addresses, an output signal from an address located nearest the output amplifier will appear at a time during the read cycle which is sooner than the time of an output signal from an address farthest from the output amplifier. In most memories such as those employing toroidal magnetic cores this time differential is negligible and usually presents little problem. In magnetic memories, on the other hand, which employ magnetic wire memory elements as the storage means, serious delays may be introduced in the arrival times of the output signals. When the memory elements are of the character described in the patent of W. A. Barrett, Jr., No. 3,067,408 of Dec. 4, 1962, for example, in which a double magnetic tape is wound about a central conductor, which conductor constitutes the sensing means, the delay line effect of the memory elements may introduce relatively wide differences in the times of arrival of the output signals from different bit addresses. It is thus apparent that, in order to strobe an output signal at or near its peak amplitude, it is necessary to delay the strobe pulse to coincide with the expected arrival time of the output signal.

It is an object of this invention to control the occurrence of a strobe pulse in accordance with the timing of an output signal during a read cycle of a magnetic information storage system.

It is another object of this invention to control the occurrence of a strobe pulse during a read cycle in a magnetic information storage system as determined by the location within the system of an information address being interrogated.

Another object of this invention is to provide a new and improved output detection circuit for magnetic memory arrangements.

These objects are realized in one specific embodiment of this invention in which the unique binary coding of an information address to be interrogated is employed to time the occurrence of the output signal strobing pulse. A brief discussion of an information storage system of the character with which this invention is advantageously adapted for use will make this clear. In the system here contemplated the memory comprises a three-dimensional arrangement of bit addresses defined as segments of magnetic wire memory elements which may be of the type described in the aforementioned patent of Barrett. The wire memory elements are parallelly arranged in a continuous belt which is passed back and forth to form parallel of the memory. The bit addresses are defined in word row groups by transverse strip solenoids each of which is coupled to a magnetic core of a coordinate array core access switch. The central conductors of the continuous memory elements also comprise the sensing means and these conductors are thus coupled to each of the corresponding bit addresses of the memory planes. The cores of the access switch are selected in the conventional manner by coincident excitation techniques, the switching of a selected core inducing the access current in the coupled solenoid of a word row being accessed.

The selection conductors of both the X and Y coordinates of the access switch are uniquely identified by a particular binary coding and an address register for each set of coordinate conductors controls the application of the coincident currents to the selection conductors as determined by the access information provided by the system. It will be appreicated in the foregoing arrangement that the binary coding of the sets of selection conductors lying parallel to the memory planes also identifies those planes. It is this identical relationship between the binary coding of one set of the selection conductors and the memory planes on which this invention is based. Each of the sensing conductors terminates in the last plane of the memory in a sense amplifier and manifestly the planes are at increasing distances from this amplifier. Output signals generated at the bit address lying along a bit line of the last plane will arrive at its sense amplifier during one time interval after the start of an access cycle, those generated at the bit addresses of the penultimate plane during an earlier time interval after the start of an access cycle, and so on, the output signals generated at the bit addresses of the first plane arriving at the sense amplifier during the first time interval after the start of an access cycle. The time intervals during which the output signals from the various planes of the memory arrive at the sense amplifier for each bit line are thus a function of the binary coding of the selection conductors lying parallel to the memory planes. This relationship advantageously provides the basis for the strobe timing circuit according to this invention.

A read cycle of the foregoing exemplary information storage system is initiated under the control of a timing signal generated in the system for coordinating the various access operations. Responsive to the timing signal address information is transmitted to the access selection circuits of the memory to select one of each of the sets of coordinate selection conductors of the access switch as discussed briefly in the foregoing. At the same time the binary coded address information of the selection conductors lying parallel to the planes of the memory is applied to a digital-to-analog converter section of a ramp voltage generator. Also under the control of the system timing signal the ramp voltage generator is triggered at the start of the read cycle. The output generated by the converter selection controls the angle of the slope of the ramp voltage. The linearly increasing output voltage of the ramp generator is applied to a comparator which latter circuit is triggered when the ramp voltage attains the level of a predetermined threshold.

When this threshold is reached an output of the comparator is employed to trigger a strobe signal generator, the output signal of which in turn is applied to the memory output signal strobing circuit. To the strobing circuit is also applied the output signal of a bit line sensing conductor of the memory. This output signal, it will be recalled, has a transmission time as determined by the position within the memory of the particular plane in which the interrogated word address is located. The strobe signal is thus timed to arrive substantially at the arrival time of the information output signal from the sense amplifier of the memory. The information representative output signal from the strobing circuit is then applied to a data register or other information utilization circuit of the system. Clearly, a number of output signals will be generated during a read cycle on the plurality of sensing conductors of the bit addresses of an interrogated word row. Each of these sensing conductors will terminate in its individual sense amplifier and strobing circuit as will be appreciated by one skilled in the art. However, since each of these signals generated at the bit addresses of a word row are subject to the same transmission delay in the sensing conductors, only a single timing circuit according to this invention need be provided. The timing circuit is reset under the control of the output signal from the comparator at the time that the strobe generator is triggered.

It will be apparent that a time variation will remain among the signals generated in the bit addresses along a sense line of a plane. These transmission time variation within a plane have been found to be negligible for the particular information storage system contemplated in the foregoing. However, time delays of the strobe signal may be obtained which correspond to the difference in transmission times of the output signals between successive bit addresses along a sense line within a plane if necessary by also employing the binary coded address information of the selection conductors of the access switch lying transverse to the memory planes. Similarly, where the time variations among the bit addresses along a sense line in a group of planes may be tolerated, the ramp generator circuit may be adjusted to respond in angular voltage steps corresponding to the binary coding of selection conductors delineating the groups of planes.

Figure 2:
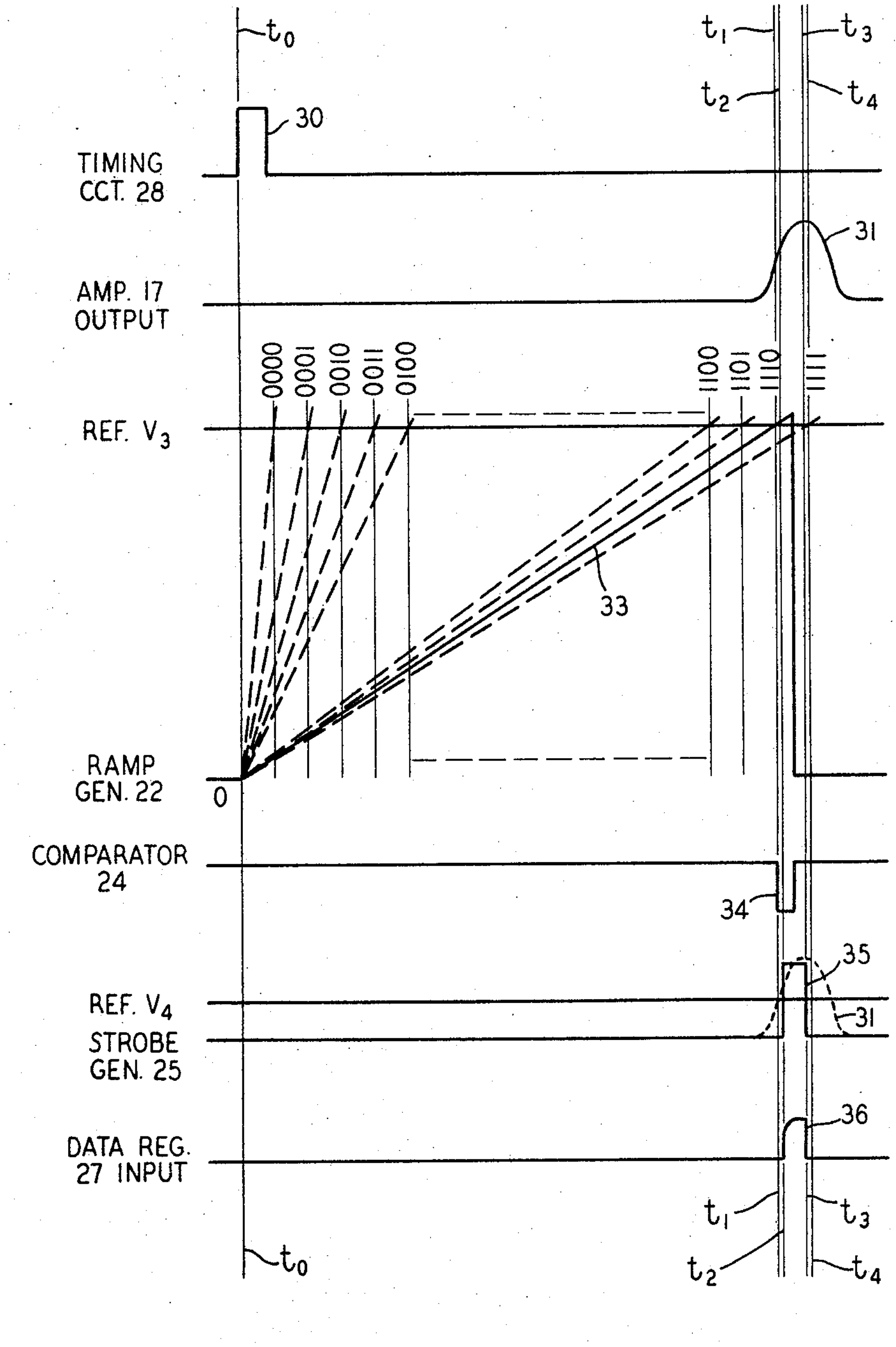

The objects and features of a strobe timing circuit according to the principles of this invention will be better understood from a consideration of the detailed description of one specific embodiment thereof when taken in conjunction with the accompanying drawing in which:

FIG. 1 depicts a partial schematic diagram of an illustrative strobe timing circuit according to this invention showing only sufficient components of a typical information storage system for a complete understanding of the invention; and FIG. 2 is a chart showing in idealized waveforms a comparison of the various signals generated during an illustrative operation of the timing circuit of the invention.

In FIG. 1 is shown the organization of a strobe timing circuit according to this invention in conjunction with the components of an illustrative information storage system in which the problem of memory output signal propagation time may arise. The memory 10 comprises a plurality of magnetic wire memory elements, a representative element 11 of which only is shown in the drawing for simplicity. The memory element 11 comprises a central conductor having a magnetic tape or tapes wound thereabout. The element 11 may either be double wound as described in the patent of Barrett, aforementioned, or it may be of the single wound type also well known in the art. The advantages of this invention will find application in memories employing either type of wire memory element. Typically associated with the memory element 11 is a return conductor 12 directly connected to one end of the memory element. A memory element return conductor pair is arranged in the memory planes by continuously passing the pair back and forth along the parallel adjacent planes. In practice a plurality of the memory elements and their associated return conductors may be conveniently fixed in an insulating belt or tape to maintatin their respective distances and coupling with the access circuitry.

The access circuitry functionally terminates at a plurality of flat strip loop solenoids 13 which encircle the memory element tape and are thus inductively coupled to segments of the magnetic tapes wound in the memory elements about the central conductors. The segments thus defined comprise the bit addresses of the planes, the solenoids locating the word rows of the memory. In FIG. 1 of the drawing the solenoids 13 are represented for clarity only as partially completed loops coupling only the single representative memory element-return conductor pair. Each of the solenoids 13 is coupled to a toroidal magnetic core 14 of an associated core array access switch. The organization and function of such a switch is well known in the art and only so much of its details are shown as are necessary for a complete understanding of this invention. With the organization of the memory in planes as above described, it will be apparent that the cores 14 will lie in rows corresponding to the memory planes and in columns corresponding to the corresponding bit addresses of the planes. The rows and columns of cores 14 of the access switch are conventionally threaded by row and column selection conductors 15 and 16, respectively. In a typical core access switch a single biasing winding threading all of the cores is also provided to maintain the cores in one condition of magnetic saturation. However, since elements of the access switch other than the cores and selection conductors are not concerned with the organization and operation of the circuit of this invention, the biasing winding has been omitted from the drawing.

Each of the memory element-return conductor pairs of the memory 10 terminates in a sense amplifier such as the representative amplifier 17 connected to the memory element 11 and return conductor 12. The selection conductors 15 and 16 are included in circuits, not shown, which may be selectively energized to control the coincident current excitation of any core of the access switch. The switching of the selected core then induces a current in the coupled solenoid 13 to affect the magnetic state of the information address segments defined in the associated word row. In conventional memory access circuitry, the selection conductor circuits are individually controlled by address registers assigned one to each of the row and column coordinate sets of selection conductors. The address registers in turn are controlled by the binary coded address information which identifies each of the selection conductors of the access switch. The address information is derived for an access operation from a source in the information storage system as is also well known. Since these circuits comprise only an exemplary context within which this invention may advantageously be employed, they are shown only generally in the drawing as an access information source 18 and X coordinate access selection circuits 19. For the specific illustrative timing circuit to be described it will become clear that the address information for the column or Y coordinate conductors need not be considered in the timing of an output signal strobe pulse. Accordingly, reference to the access circuitry for these selection conductors is also omitted from the drawing.

During a read cycle of operation of a memory with which the circuit of this invention may be employed, the binary address bits identifying a particular X coordinate selection conductor of the access switch, in addition to being transmitted to the X coordinate access selection circuits, are carried to a digital-to-analog converter section of a ramp voltage generator 22. In the illustrative embodiment of this invention being described, the converter section comprises four capacitors $C_1$ through $C_4$ having one side connected together and through a fifth capacitor $C_5$ to ground. The other sides of the capacitors $C_1$ through $C_4$ are connected to the collectors of individual transistors $T_1$ through $T_4$ which are in turn connected to the address inputs of the converter section. In order to provide the required charge levels in accordance with the four bits of the binary coded inputs, the capacitors $C_1$ through $C_4$ are weighted $$C_4=2C_3=4C_2=8C_1$$

A transistor $T_5$, diode $D_1$, and resistor $R_1$ act as a constant current generator, the output of which is normally shunted to ground under the control of a transistor $T_6$. The latter transistor is in turn controlled by the output of a flip-flop 23. The output of the converter section of the ramp generator 22 is applied to the base of an emitter follower transistor $T_7$. The output of the ramp generator is taken from the emitter of the latter transistor and applied to a succeeding stage of the timing circuit of this invention, a comparator circuit 24. Other details of the exemplary ramp generator 22 are more conveniently considered in connection with a description of an illustrative operation of this invention hereinafter. At this point it is to be understood that the output of the ramp generator consists of a linearly increasing ramp voltage signal the slope of which is variable in angular increments as controlled by the analog output charge of the converter section of the generator 22.

The ramp voltage output of the ramp generator 22 is applied to the input of the comparator circuit 24 which functions as a threshold means. When the linearly increasing signal from the ramp generator 22 reaches a predetermined threshold, the comparator circuit 24 supplies an output signal to trigger a strobe generator 25. Exemplary details of the comparator circuit 24 will be described in connection with the description of an illustrative operation of the timing circuit as a whole. However, it will be appreciated that circuits capable of performing the described functions of the comparator circuit 24 and the strobe generator 25, for example, are well known and are readily devised by one skilled in the art.

An output of the strobe generator 25 is connected to one input of a strobing circuit 26, a second input of which has connected thereto the output of the sense amplifier 17. The actual strobing operation of the information representative output signal from the sense amplifier 17 is performed in the strobing circuit 26 and since this is essentially a comparison operation the latter circuit is shown as substantially similar in detail to the comparator circuit 24. The strobed output of the circuit 26 is transmitted to the information utilization circuits of the information storage system such as data register 27. Timing control of the various circuits is provided by the system timing circuits 28, outputs of which are shown as connected to the access information source 18 and also to the ramp geneartor 22. Other details and circuit elements will be more conveniently considered in a description of an illustrative read strobe operation of this invention which follows.

In FIG. 1 the memory 10 is shown with an undetermined capacity, only representative crosspoints of the access switch and a single representative bit address line being shown for simplicity. For purposes of this description, however, it will be assumed that the memory 10 has a capacity of 16 x 16 binary words. The number of bit addresses per word need not be established for an understanding of this invention. It will further be assumed that the word address to be interrogated during an illustartive read cycle of operation is that defined by the core 14' of the access switch. The core 14' is shown shaded in the drawing for ease of identification and is defined in the access switch by the row selection conductor $\mathbf{15}_{14}$ and column selection conductor $\mathbf{16}_{13}$. The start of a read cycle is initiated by a timing pulse from the system timing circuits 28 at the time $t_0$, the timing pulse being represented by the idealized waveform 30 in FIG. 2. The pulse 30 controls the transmission of the address information coded signals from the source of access information and also controls circuitry, not shown, for connecting current sources to the X and Y coordinate selection conductors of the access switch. The coded signals representing the address bits identifying the X selection conductor $\mathbf{15}_{14}$ and the Y selection conductor $\mathbf{16}_{13}$ are transmitted to the access selection circuits 19 for the X conductors and to similar circuitry, not shown in the drawing, for the Y conductors. It will be understood that the circuitry for the two coordinate conductors direct coincident currents to the two selected conductors which identify the core 14' in the access switch. The selection operation by means of the binary coded address bits is well known in the art and is mentioned here briefly merely to provide a background for the description of the operation of the circuit of this invention.

As the coincident currents applied to the selection conductors $\mathbf{15}_{14}$ and $\mathbf{16}_{13}$ cause the core 14' to switch, a drive current is induced in its coupled solenoid 13'. This drive current, which is not depicted in FIG. 2, applies a magnetomotive drive to each of the information address segments defined on the portions of the memory elements of the plane lying parallel to the X selection conductor $\mathbf{15}_{14}$. In the information storage system contemplated in the foregoing, it is assumed that the two binary values are indicated by the fact that for one an output signal is generated and for the other no signal is generated in accordance with conventional practice. Since only a representative one of the memory elements 11 is shown in FIG. 1, it will also be assumed that the address segment defined thereon by the solenoid 13' coupled to the selected core 14' contains a binary value which provides a positive output signal during a read cycle. This positive signal generated as a result of the switching of the core 14' is transmitted along the circuit including the conductor 12 and central conductor of the memory element 11 to the sense amplifier 17.

Due to the delay line effect of the memory element 11, the output signal generated in the interrogated bit address lying in the plane along the selection conductor $\mathbf{15}_{14}$ will take an appreciable time to reach the sense amplifier 17. This time is different for each of the addresses defined along the memory element 11 and each of the groups of addresses lying in the planes has its own time span during which output signals generated in any of the addresses of the group arrive at the amplifier 17. The time variations within an address group of a plane are small, however, and frequently do not present a serious problem. As a result, in many information storage systems these time variations within a plane may be tolerated. Manifestly, the time spans for each plane will occur at progressively longer intervals after the initiation of the read cycle at the time $t_0$ the farther removed the plane is from the sense amplifier 17. And each of these different time intervals is directly related to the binary coding of the X coordinate selection conductor 15 associated with the plane. The output signal generated during the read cycle initiated at the time $t_0$ discussed above, coming as it does from an address on the plane of selection conductor $\mathbf{15}_{14}$, arrives during a time span indicated in FIG. 2 as measured by times $t_1$ and $t_4$, and within that span, at the time $t_3$, the output signal being represented by the waveform 31.

In the specific embodiment of this invention depicted in FIG. 1, it was assumed that the memory 10 was comprised of sixteen planes each having sixteen bit addresses defined thereon for each memory element 11. Each of the planes and selection conductors 15 may be positively identified by four binary address bits as follows:

| Binary Address Coding | X Selection Conductor |
|---|---|
| 0 0 0 0 | $15_0$ |
| 0 0 0 1 | $15_1$ |
| 0 0 1 0 | $15_2$ |
| 0 0 1 1 | $15_3$ |
| 0 1 0 0 | $15_4$ |
| 0 1 0 1 | $15_5$ |
| 0 1 1 0 | $15_6$ |
| 0 1 1 1 | $15_7$ |
| 1 0 0 0 | $15_8$ |
| 1 0 0 1 | $15_9$ |
| 1 0 1 0 | $15_{10}$ |
| 1 0 1 1 | $15_{11}$ |
| 1 1 0 0 | $15_{12}$ |
| 1 1 0 1 | $15_{13}$ |
| 1 1 1 0 | $15_{14}$ |
| 1 1 1 1 | $15_{15}$ |

At the time $t_0$ coded signals representative of the address bits 1 1 1 0, applied via the access selection circuits 19 to control the application of an energizing current to the selection conductor $15_{14}$, are also applied to the converter section of the ramp generator 22. The four signal conditions representative of these address bits are applied to four inputs of the converter section.

In the ramp generator 22, as previously mentioned, transistor $T_5$, diode $D_1$, and resistor $R_1$, act as a current generator. This follows as a result of the constant voltage developed across the emitter resistor $R_1$ in turn due to a constant voltage existing across a diode $D_1$ connected between the base of transistor $T_5$ and a source of potential $V_1$. This constant current is normally shunted to ground by normally on transistor $T_6$. The latter transistor is turned off under the control of a negative-going signal from the normally high output of flip-flop 23. Flip-flop 23 is set at the time $t_0$ by the positive signal 30 supplied by the system timing circuits 28 which also control at the time $t_0$ the application of the address bit inputs to the converter section of the ramp generator 22. When transistor $T_6$ is turned off, the constant current generated by the transistor $T_5$ is diverted to capacior $C_5$ and some combination of capacitors $C_1$ through $C_4$ as controlled by whichever of the associated transistor $T_1$ through $T_4$ is energized.

In accordance with the assumed illustrative read operation being described, signals representative of the binary bits 1 1 1 0 are applied from the access information source 18 of the system to the converter section inputs. As a result, transistors $T_2$, $T_3$, and $T_4$ are energized thereby causing the charging of capacitors $C_2$, $C_3$, $C_4$, and $C_5$. The result of the charging of these capacitors with the constant current diverted from ground by the de-energization of transistor $T_6$ is a linearly increasing ramp voltage 33 at the output of the ramp generator 22 which output is taken from the emitter of emitter-follower transistor $T_7$. The slope of the output ramp voltage is manifestly determined by the sum value of the capacitance of the charged capacitors $C_2$ through $C_5$ which in turn is determined by the combination of coded inputs applied to the associated transistor $T_2$ through $T_4$ switch transistors. The relative values of the capacitors $C_1$ through $C_4$ are chosen so that in various combinations the sum charge is a function of the binary coded input signals on the inputs of the ramp generator 22. The slope of the output ramp signal 33, as a result, may be selectively controlled to vary in angular increments in accordance with the binary address inputs. The angular increments possible in the ramp voltage 33 of the specific illustrative embodiment of this invention being described are represented in FIG. 2 by the series of angular steps shown in broken outline, the present applicable voltage slope being indicated as the solid line slope 33. The angles of the ramp voltage slope range from the slope resulting from the application of the address bits 0 0 0 0 to the sixteenth ramp slope resulting from the application of the address bits 1 1 1 1. Any selected one of these ramp voltages is assumed to begin at the time $t_0$, that is, at the start of the read cycle. The steepest voltage slope may be established at a predetermined angle as dictated by other circuit delays and timing considerations of the information storage system generally.

In accordance with the illustrative operation being described, signals representative of the binary bits 1 1 1 0 are applied from the access information source of the system to the converter section inputs of the ramp generator 22. As a result, the inputs $2^3$, $2^2$, and $2^1$ are energized thereby causing an output voltage of the second least angular slope at the output of the ramp generator 22 as indicated by the waveform 33 in FIG. 2. This voltage is applied to the comparator 24, more specifically, to the base of a transistor $T_8$ of the latter circuit. This transistor is normally maintained nonconducting by the transistor $T_9$ which transistor is connected in parallel across transistor $T_8$ between a voltage source $V_2$ and ground. The transistor $T_9$ is normally maintained in a conducting state by a reference voltage source $V_3$ connected to its base. The reference voltage $V_3$ is represented in FIG. 2 as intersecting the ramp voltage 33 at the time $t_1$. Transistor $T_8$ is maintained in its conducting state until the ramp voltage 33 applied to its base reaches the amplitude of the reference voltage $V_3$ at the time $t_1$ whereupon the transistor $T_9$ is cut off and transistor $T_8$ is turned on. A negative pulse is generated as a result on the collector of the now conducting transistor $T_8$. This negative pulse, shown in FIG. 2 as the waveform 34 occurring at the time $t_1$, is applied to trigger the strobe generator 25. The strobe generator 25 may comprise any circuit readily envisioned by one skilled in the art for generating a positive output signal such as a monostable flip-flop, for example. The strobe generator 25 supplies a positive strobe pulse 35 to the strobing circuit 26 and this circuit accomplishes the actual strobing of the information signal output from the sense amplifier 17. As previously mentioned, the peak amplitude of the output signal 31 can occur anytime during the time interval $t_1$–$t_4$ depending upon which bit address along a bit line within the selected plane is being interrogated. Accordingly, the strobe pulse 35 is timed to occur midway during the interval $t_1$–$t_4$, that is, at the time $t_2$. The delay $t_1$ to $t_2$ may readily be achieved by suitable delay circuitry, not shown in the drawing, within the strobe generator 25.

The circuit details of the strobing circuit 26 may conveniently follow those of the comparator circuit 24 with the exception that a control transistor is connected in the emitter circuits of the two comparing transistors. The output signal 31 of the sense amplifier 17 is applied to the base of a transistor $T_{10}$, the strobe pulse 35 being applied to the base of the control transistor $T_{11}$. The operation of the strobing circuit 26 is similar to that of the comparator 24 in that transistor $T_{10}$ is maintained nonconducting while its base voltage is lower than the applied base voltage of transistor $T_{12}$. The base of the latter transistor has continuously applied thereto a reference voltage $V_4$ and would normally be conducting until the level of the signal from sense amplifier 17 exceeds the reference voltage $V_4$. Discrimination between a substantially no signal output indicative of one binary value and a full-valued signal indicative of the other binary value during a read cycle is thus achieved. Neither of the transistors $T_{10}$ nor $T_{12}$, however, can conduct until the control transistor $T_{11}$ is turned on by the strobe pulse 35 at the time $t_2$.

When the strobe pulse 35 is applied to the base of transistor $T_{11}$ at the time $t_2$, the transistor $T_{12}$ is permitted to conduct, but only if the reference voltage $V_4$ is greater in amplitude than the signal applied to the base of transistor $T_{10}$. This would be the case if the effectively no signal condition is transmitted from the sense amplifier 17. However, it will be recalled that it was assumed that the information bit contained in the bit address of the memory element 11 being interrogated as such as to generate a positive output signal as indicated in FIG. 2 by the waveform 31. When the signal 31 reaches the amplitude of the reference voltage $V_4$, transistor $T_{10}$ begins to conduct and will continue to conduct only for the time during which both the strobe pulse 35 and the portion of the output signal 31 exceeding the reference voltage $V_4$ are applied to the strobing circuit 26. As is clear from FIG. 2, a portion of the information representative signal 31 is available at the collector of the transistor $T_{10}$ as a strobed output signal 36. This signal 36 is then transmitted to the utilization circuits of the information storage system such as a data register 27.

In accordance with the objectives of this invention, the strobe pulse 35 has thus been timed to occur at the strobing circuit 26 substantially concurrently with the peak amplitude of the output signal 31 from the sense amplifier 17. An identical operation of the timing circuit according to this invention to that just described is completed for each angular increment of the analog voltage 33 with the strobe pulse 35 being positioned with respect to the time $t_0$ to occur at time $t_2$ whenever the latter time is determined by whichever of the planes in which an interrogated bit address is located. The timing circuit is reset by the comparator 24 output signal 34 which, in addition to being applied to trigger the strobe generator 25, is also transmitted to the reset input of the flip-flop 23 of the ramp generator 22. Upon the reset of the latter flip-flop, the "0" output connected to the base of transistor $T_6$ is restored to its normally high potential and the latter transistor is again restored to its normally conducting state. As a result, the capacitors $C_1$, $C_2$, $C_3$, and $C_5$ are discharged thereby terminating the ramp voltage 33. The timing circuit is now prepared for another read cycle of the information storage system.

It will be appreciated that, in the chart of FIG. 2, the relative spacings indicative of time durations have been exaggerated for effect. In practice the variations possible, for example, in the arrival time at the sense amplifier 17 of an output signal 31 are relatively considerably smaller than they appear in FIG. 2 as between the times $t_1$ and $t_4$. The occurrence of the strobe pulse 35 in its position midway between these times, will be much closer to the peak amplitude of the output signal 31 than apparently indicated in FIG. 2. In one application of the timing circuit of this invention, for example, the total possible delay of the output signal 31 was found to be 0.7 microseconds and the increments between strobe pulse 35 positions was detrmined as 0.044 microseconds, the strobe pulse having a width of 0.16 microseconds.

In the specific embodiment of this invention described in the foregoing the variations in arrival times at the sense amplifier 17 of the output signal from the memory 10 within a plane on a bit line were found to be tolerable. Accordingly, an average timing of the strobe signal 35 was permitted. It may also be found in practice that variations in arrival times from groups of addresses ranging across several planes may be served by a strobe pulse timed for an average delay for all of such addresses within a group. In such a case, the address bits may be selected which identify the planes in which the average time signals originate for control of the timing of the strobe signal. The inputs to the ramp generator 22 may thus selectively comprise any of the address information signals from the access information source 18 as determined by the number of increments of delay desired for the strobe signal. Further, it will be appreciated that the strobe signal may be timed for each increment of delay introduced by the difference in distance from the sense amplifier 17 along a bit line of each of the information addresses. This may be accomplished by increasing the number of inputs to the ramp generator 22 to include the address information bits of the Y selection conductors 16 thereby to multiply the number of angular increments of the voltage 33.

What has been described is considered to be only one specific illustrative embodiment of this invention and it is to be understood that variations and numerous other arrangements may be devised by one skilled in the art without departing from the spirit and scope of this invention as defined by the accompanying claims.

What is claimed is:

1. A memory system comprising a plurality of information addresses at different locations within said system, means responsive to particular binary codes for selectively applying read excitations to said addresses during a read cycle, a plurality of output conductors associated respectively with said information addresses and providing information output signals at different times corresponding to said different locations of said addresses within said system, means for generating an increasing signal at times related to said read exitations, means responsive to said particular binary codes for controlling the slope of said increasing signal, a comparator circuit having a predetermined threshold energized responsive to said increasing signal when the last-mentioned signal corresponds to said predetermined threshold to generate a strobe control signal, and strobe generator means energized responsive to said strobe control signal for generating strobe signals occurring at substantially said different times of said information output signals.

2. A memory system as claimed in claim 1 also comprisng strobing circuit means energized responsive to the coincident application of said information output signals and said strobe signals for generating strobed information signals.

3. An output circuit for an information storage system having a plurality of information addresses arranged in a sequence along a sensing conductor, access means responsive to binary coded signals individual to each of said addresses for generating output signals indicative of stored information, said output signals arriving at different times on said sensing conductor at the end of said sequence, said output circuit comprising converter means for converting said binary coded signals to analog signals, means for generating a linearly increasing variable slope signal, means responsive to said analog signals for controlling the slope of said variable slope signal, comparator circuit means energized responsive to the coincidence in amplitude of a predetermined reference signal and said variable slope signal for generating a trigger signal, strobe generator circuit means energized responsive to said trigger signal for generating a strobe signal, and circuit means energized responsive to the coincidence of said output signals and said strobe signal for generating a strobed information output signal.

4. An output circuit as claimed in claim 3 also comprising means responsive to said trigger signal for terminating said variable slope signal.

5. An output circuit as claimed in claim 3 in which said information addresses comprise segments of a magnetic tape helically wound about a continuous central conductor and said sensing conductor comprises said continuous central conductor.

6. An information storage circuit comprising a plurality of information addresses lying in rows of a coordinate array, a continuous sensing conductor coupled to said plurality of addresses having output signal detection means connected thereto at one end, access means for each of said plurality of information addresses of said rows energized at a predetermined time responsive to binary coded signals individual to said rows for generating information output signals on said sensing conductor at particular locations in said rows, said output signals arriving at said detection means at times as determined by the row of origin of said output signals, converter means energized responsive to said binary coded signals for generating corresponding analog signals, means including said converter means for generating a linearly increasing ramp signal initiated at said predetermined time and including means for controlling the slope of said ramp signal in accordance with said analog signal, comparator circuit means energized responsive to the coincidence in amplitude of a predetermined signal and said ramp signal for generating a trigger signal, strobe generator means energized responsive to said trigger signal for generating a strobe signal, and circuit means energized responsive to the coincidence of an output signal from said detection means and said strobe signal for generating an information output signal.

7. In combination, a memory having a plurality of bit addresses, a source of signals representative of binary access codes, means for accessing said memory in accordance with said code signals for generating output information signals, said last-mentioned information signals having transmission delays related to said binary access codes, and means for strobing said information output signals comprising means for generating a linearly increasing ramp signal, means energized responsive to said code signals for controlling the slope of said ramp signal in accordance with said transmission delays, comparator circuit means having a predetermined operating threshold energized responsive to the coincidence of the amplitude of said ramp signal with said operating threshold for generating a trigger signal, strobe generator means energized responsive to said trigger signal for generating a strobe signal, and a strobing circuit means energized responsive to the conicidence of said information signals and said strobe signal.

8. An information storage circuit comprising a memory element comprising an electrical conductor having a magnetic tape helically wound thereon, said tape having a plurality of information addresses defined at spaced apart intervals thereon, said addresses being identified by different binary codes, a sense amplifier connected at one end of said electrical conductor, a plurality of access means selectively controllable responsive to combinations of signals representative of said binaray codes at a predetermined time for generating output signals on said electrical conductor representative of information stored in said addresses, said output signals having delay times at said sense amplifier as determined by the location of said addresses on said tape, means for generating an increasing signal initiated at said predetermined time including means comprising a plurality of capacitor circuits selectively energizable responsive to said combination of signals for controlling the slope of said increasing signal, comparator circuit means energized responsive to the coincidence of the amplitudes of a predetermined voltage level and said increasing signal for generating trigger signals, and strobe generator means energized responsive to said trigger signals for generating strobe signals having substantially the delay times of said output signals.

9. An infromation storage circuit as claimed in claim 8 also comprising strobing circuit means energized responsive to said output signals and said strobe signals for strobing said output signals.

10. An information storage circuit as claimed in claim 9 also comprising a timing circuit means for controlling the operation of said access means and said means for generating said increasing signal at said predetermined time and means responsive to said trigger signals for terminating said increasing signal.

11. In an information storage circuit having output signals generated therein during readout at different times related to the binary coded signals representative of the binary coded address being interrogated, a timing circuit for timing a strobe signal in accordance with the timing of said output signals comprisng means for converting said binary coded signals to corresponding analog capacitor charges, means for generating a linearly increasing ramp voltage having a slope determined by said capacitor charges, comparator circuit means having a predetermined operating threshold including means for generating a trigger signal responsive to the coincidence of amplitude of said ramp voltage and said operating threshold, and strobe generator means responsive to said trigger signal for generating a strobe signal.

12. In an information storage circuit as claimed in claim 11, strobing means for generating strobed information signals responsive to the coincidence of said output signals and said strobe signal.

13. In an information storage circuit as claimed in claim 12, said strobing means having a predetermined threshold for disabling said strobing means when said output signals have an amplitude below said predetermined threshold.

References Cited

UNITED STATES PATENTS

| | | | |
|---|---|---|---|
| 3,015,809 | 1/1962 | Myers | 340—174 |
| 3,178,692 | 4/1965 | Hamilton | 340—174 |

OTHER REFERENCES

Councill, et al.: Strobe Generator For Magnetic Memory. IBM Technical Disclosure Bulletin, vol. 3, No. 4, September 1960, pp. 51.

BERNARD KONICK, *Primary Examiner.*

G. M. HOFFMAN, *Assistant Examiner.*